(12) United States Patent
Cho et al.

(10) Patent No.: US 7,337,549 B2
(45) Date of Patent: Mar. 4, 2008

(54) INPUT DEVICE FOR USING GEOMAGNETIC SENSOR AND A METHOD THEREOF FOR GENERATING INPUT SIGNAL

(75) Inventors: Woo-jong Cho, Suwon-si (KR); Sang-on Choi, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 109 days.

(21) Appl. No.: 11/028,593

(22) Filed: Jan. 5, 2005

(65) Prior Publication Data

US 2005/0150122 A1 Jul. 14, 2005

(30) Foreign Application Priority Data

Jan. 9, 2004 (KR) ............... 10-2004-0001668

(51) Int. Cl.
*G01C 17/38* (2006.01)
(52) U.S. Cl. ............... 33/356; 33/355 R; 33/316; 702/94
(58) Field of Classification Search ............ 33/356, 33/355 R, 351, 352, 357, 316, 1 E; 702/92–94; 324/244, 260
See application file for complete search history.

(56) References Cited

U.S. PATENT DOCUMENTS

| | | | | |
|---|---|---|---|---|
| 4,797,841 A | * | 1/1989 | Hatch | 702/92 |
| 5,151,862 A | * | 9/1992 | Nakayama et al. | 701/221 |
| 5,440,303 A | * | 8/1995 | Kinoshita | 340/901 |
| 5,440,484 A | * | 8/1995 | Kao | 701/207 |
| 5,953,683 A | * | 9/1999 | Hansen et al. | 702/95 |
| 6,130,534 A | * | 10/2000 | Huang et al. | 324/202 |
| 6,836,971 B1 | * | 1/2005 | Wan | 33/356 |
| 6,860,023 B2 | * | 3/2005 | Manfred et al. | 33/356 |
| 6,871,411 B1 | * | 3/2005 | Kang et al. | 33/356 |
| 6,957,156 B2 | * | 10/2005 | Jo et al. | 702/51 |
| 6,964,107 B1 | * | 11/2005 | Ahola | 33/356 |
| 7,086,164 B2 | * | 8/2006 | Satoh et al. | 33/316 |
| 7,146,740 B2 | * | 12/2006 | Manfred | 33/356 |
| 7,168,176 B2 | * | 1/2007 | Lee et al. | 33/356 |
| 7,181,857 B2 | * | 2/2007 | Lee et al. | 33/356 |
| 2002/0100178 A1 | * | 8/2002 | Smith et al. | 33/356 |
| 2004/0172838 A1 | * | 9/2004 | Satoh et al. | 33/316 |
| 2006/0123642 A1 | * | 6/2006 | Lee et al. | 33/355 R |

FOREIGN PATENT DOCUMENTS

| KR | 2002-0030244 A | 4/2002 |
|---|---|---|
| KR | 2003-0067471 A | 8/2003 |

* cited by examiner

*Primary Examiner*—G. Bradley Bennett
*Assistant Examiner*—Tania C Courson
(74) *Attorney, Agent, or Firm*—Sughrue Mion, PLLC

(57) ABSTRACT

An input device using a geomagnetic sensor includes a geomagnetic sensor outputting a voltage corresponding to geomagnetism, and a control part calculating an azimuth using the voltage output from the geomagnetic sensor and calculating the rotation angle by comparing the azimuth to a previously measured azimuth, thereby generating the input signal corresponding to the rotation angle when the input device is tilted within a certain range. Accordingly, unwanted generation of the input signal is prevented when the input device is tilted by more than a certain angle.

16 Claims, 5 Drawing Sheets

INPUT DEVICE FOR USING GEOMAGNETIC SENSOR AND A METHOD THEREOF FOR GENERATING INPUT SIGNAL

CROSS-REFERENCE TO RELATED APPLICATIONS

This application claims priority from Korean Patent Application No. 2004-1668, filed Jan. 9, 2004, in the Korean Intellectual Property Office, the disclosure of which is incorporated herein by reference.

BACKGROUND OF THE INVENTION

1. Field of the Invention

The present invention relates to an input device which measures changes of a rotation angle to use the measured changes as an input signal, and a method for the same. More particularly, the present invention relates to an input device which measures a rotation angle using a magnetic sensor and generates an input signal corresponding to the measured rotation angle in order to prevent generation of a wrong input signal by ignoring the rotation angle measured when the input device is tilted by more than a certain angle, and a method for generating the input signal.

2. Description of the Related Art

Recently, as electronic technology and network communication technology develops, the use of a variety of portable electronic devices such as a mobile phone, a personal digital assistant (PDA) and a notebook computer has been increasing. Many of these electronic devices are equipped with various functions such as games, text message service and notepads, and users can utilize the functions through an input means provided with the devices. Since mobile contents services have become more common, assorted games enjoyable through the mobile phones have become very popular. However, these portable electronic devices have a limitation in hardware compared to a personal computer (PC) and other game machines, which can comprise a variety of input means such as a mouse, a joystick and a keyboard.

Therefore, key input means such as numeric keys and direction keys are used in the portable electronic devices. A voice recognition function had once been developed and popularized, in which a certain word is recorded in a memory in the form of voice so that various operations are performed through the voice recognition as a user speaks the word. However, due to incorrectness and inconvenience, the voice recognition function is rarely used in the portable electronic devices.

In order to overcome the hardware limitation, an input device has been used, which measures a rotation angle of the portable electronic device and generates an input signal corresponding to the rotation angle. The input device usually comprises a built-in gyrosensor to measure the rotation angle and generate the corresponding input signal. When the user wants to move a cursor in a certain direction while searching a screen of the portable electronic device, the user orients the device in the desired direction. By this, the rotation angle for orientation is sensed by the gyrosensor, and the cursor is moved to the rotated direction or the counter-rotated direction.

The gyrosensor measures a rotation angle. More specifically, the gyrosensor measures the rotation angle first to calculate a rotation amount of the portable electronic device, and integrates the measured rotation angle with respect to time, thereby calculating a moving distance.

By using the rotation angle for the input signal, even minute operations not performable by the simple key operation, can be implemented. However, since the gyrosensor performs the integral operation several times to obtain the rotation angle, an integral constant is caused, and an error is generated as the integral constants are accumulated. More specifically, although the user rotates the portable electronic device by a certain angle and stops rotating, the gyrosensor considers it as continuous rotation due to the integral constant and continuously generates the input signals corresponding to the rotation angle. As a result, resolving power of the input device is deteriorated and there is a lack of precise control.

Alternatively, a geomagnetic sensor capable of measuring a rotation angle can be employed in the input device. The geomagnetic sensor senses degree and direction of geomagnetism that humans cannot sense. A geomagnetic sensor using a fluxgate is called a fluxgate geomagnetic sensor.

The fluxgate geomagnetic sensor uses a material of high magnetic permeability, such as permalloy, as a magnetic core to apply excitation by a driving coil and measure second harmonics. The excitation is proportional to an external magnetic field, using magnetic saturation and a non-linear magnetism of the magnetic coil, thereby measuring degree and direction of an external magnetic field.

The fluxgate geomagnetic sensor, introduced in the late 1930's, is superior to other types of geomagnetic sensors in sensitivity, economy and compactness. Further, the fluxgate geomagnetic sensor is power-saving and superior in long-term stability. Therefore, the fluxgate geomagnetic sensor is most widely used for civilian requirements and military affairs, for example, detection of weak magnetic field, measurement of terrestrial absolute direction, lode detection, mark detection, control of posture of an artificial satellite, and space exploration. Even today, research for improving the fluxgate is underway.

Recently, a micro-fluxgate sensor has been under development for low power consumption, using a micro electro-mechanical system (MEMS) technology.

Such micro-geomagnetic sensor is used in miniaturized portable electronic devices and is advantageous in higher resolving power and less errors caused by the accumulated integral constant.

In order to measure the rotation angle using the geomagnetic sensor, the geomagnetic sensor such as the fluxgate sensor is driven first, and an azimuth is measured by measuring voltage induced to the geomagnetic sensor. By comparing the azimuth to a previously measured azimuth, the rotation angle is obtained.

However, when the portable electronic device having the geomagnetic sensor is tilted, the azimuth can not be correctly measured. Therefore, when the horizontalness of the portable electronic device is not maintained, the geomagnetic sensor is not appropriate for use in the input device.

The horizontalness of the geomagnetic sensor is expressed by a pitch angle and a roll angle. When the pitch angle and the roll angle are both 0°, the geomagnetic sensor is considered to be horizontal. FIG. 1 illustrates an X-axis and a Y-axis perpendicular to each other, which are standards for measuring the pitch angle and the roll angle in a general portable device 10, on which are disposed a geomagnetic sensor 11 and an accelerometer 13. When the portable device 10 rotates about the X-axis, an angle between the portable device 10 and the Y-axis is the pitch angle, and when the portable device 10 rotates about the Y-axis, an angle between the portable device 10 and the X-axis is the roll angle. That is, the X-axis and the Y-axis, respectively, become a roll-axis and a pitch-axis.

FIG. 2 is a schematic view of a mobile phone 20 including the geomagnetic sensor 11, for explaining a method for playing a game using the mobile phone 20. As shown in FIG. 2, if a user is playing a car-racing game, the user can control a moving direction of a car displayed on a screen 25 by rotating the mobile phone 20 in a desired direction.

For this, a yaw angle is measured, and an input signal is generated according to change of the yaw angle. As shown in FIG. 2, the yaw angle refers to a rotation angle with respect to a Z-axis which is perpendicular to a plane comprising the X-axis and the Y-axis. General input devices using the geomagnetic sensor measure the yaw angle, that is, the azimuth and compare it to the previous azimuth. The change degree of the azimuth is considered to be the rotation angle. After the rotation angle is measured, an input signal is generated so that a cursor is moved in the rotation direction in proportion to the rotation angle. However, when the mobile phone 20 is not put on a level surface such as a desk during the game, the mobile phone 20 may be tilted, and in this case, fluxgate voltage output from the geomagnetic sensor 11 may change. Therefore, even when the mobile phone 20 is not rotated but only tilted, the mobile phone 20 recognizes this as rotation and generates the input signal. Accordingly, an unexpected input signal may be generated. Therefore, this kind of game is not enjoyable through the mobile phone 20.

There has been much research on methods for compensating an influence of tilt, to measure the rotation angle more precisely. However, since the input device should react immediately according to the input signal, if a process of tilt compensation is included, the reaction is delayed due to an operation load.

SUMMARY OF THE INVENTION

An aspect of the present invention is to solve at least the above problems and/or disadvantages and to provide at least the advantages described below. Accordingly, an aspect of the present invention is to provide an input device using a geomagnetic sensor, which is capable of measuring a rotation angle according to a tilted degree when the device is tilted, thereby preventing malfunction caused by the tilt, and a method for generating an input signal thereof.

An exemplary embodiment of the present invention includes an input device which generates an input signal, when the device is rotated to cause change of a yaw angle, the input signal corresponding to the rotated degree. The input device comprises a geomagnetic sensor outputting a voltage corresponding to geomagnetism, and a control part calculating an azimuth using the voltage output from the geomagnetic sensor and calculating the rotation angle by comparing the azimuth to a previously measured azimuth, thereby generating the input signal corresponding to the rotation angle when the input device is tilted within a certain range.

The geomagnetic sensor comprises a bi-axis fluxgate in which two fluxgates are respectively formed in directions of an X-axis and a Y-axis perpendicular to each other on a plane of the input device, and outputs voltages of each fluxgate corresponding to magnetism generated by a predetermined driving signal. Accordingly, the control part can calculate the azimuth.

The input device may further comprise a driving pulse generation circuit for outputting the driving signal to drive the geomagnetic sensor, and an accelerometer for measuring a pitch angle and a roll angle of the input device.

The control part ignores the azimuth if the pitch angle and the roll angle are greater than the threshold, thereby considering the input device unrotated. Therefore, unwanted generation of the input signal can be prevented.

The input device may further comprise a memory for storing the maximum pitch angle and the roll angle allowable, which are experimentally determined, as the threshold.

The control part may ignore the azimuth measured when the input device is tilted by more than a certain angle, such that any input signal is generated. However, a user may select a tilt compensation mode for compensation of an influence of tilt, thereby measuring the rotation angle precisely.

An externally input signal may change the mode so that an influence of the pitch angle and the roll angle can be compensated using a tilt compensation algorithm. In this case, the input device may further comprise a key input part for inputting an external control signal for selection of the tilt compensation mode.

A method for generating an input signal in an input device when the input device is rotated so that a yaw angle is changed, the input signal corresponding to the rotation angle, comprising the steps of (a) outputting a voltage corresponding to geomagnetism; (b) calculating an azimuth using the voltage output from the geomagnetic sensor and calculating the rotation angle by comparing the azimuth to a previously measured azimuth; and (c) generating the input signal corresponding to the rotation angle when the input device is tilted within a certain range.

The step (a) comprises a step of outputting voltages of each fluxgate in a bi-axis fluxgate in which two fluxgates are respectively formed in directions of an X-axis and a Y-axis perpendicular to each other on a plane of the input device, the voltages corresponding to magnetism.

The method may further comprise a step of measuring a pitch angle and a roll angle of the input device for measurement of the rotation angle of the input device.

The step (c) comprises a step of ignoring the azimuth if the pitch angle and the roll angle are greater than the threshold, thereby considering the input device unrotated.

The method further comprises the steps of inputting an external control signal for selection of a tilt compensation mode to compensate an influence of tilt of the input device while operating the azimuth; and when the tilt compensation mode is selected, operating the azimuth as compensated with the influence of the pitch angle and the roll angle, using a predetermined tilt compensation algorithm.

The step (b) comprises the steps of setting a predetermined sensitivity denoting a change of the input signal reacting to the rotation angle; and compensating the rotation angle by reflecting the sensitivity.

BRIEF DESCRIPTION OF THE DRAWING FIGURES

The above aspects and other features of the present invention will become more apparent by describing in detail exemplary embodiments thereof with reference to the attached drawing figures, wherein.

DETAILED DESCRIPTION OF THE EXEMPLARY EMBODIMENTS

Figure 1:
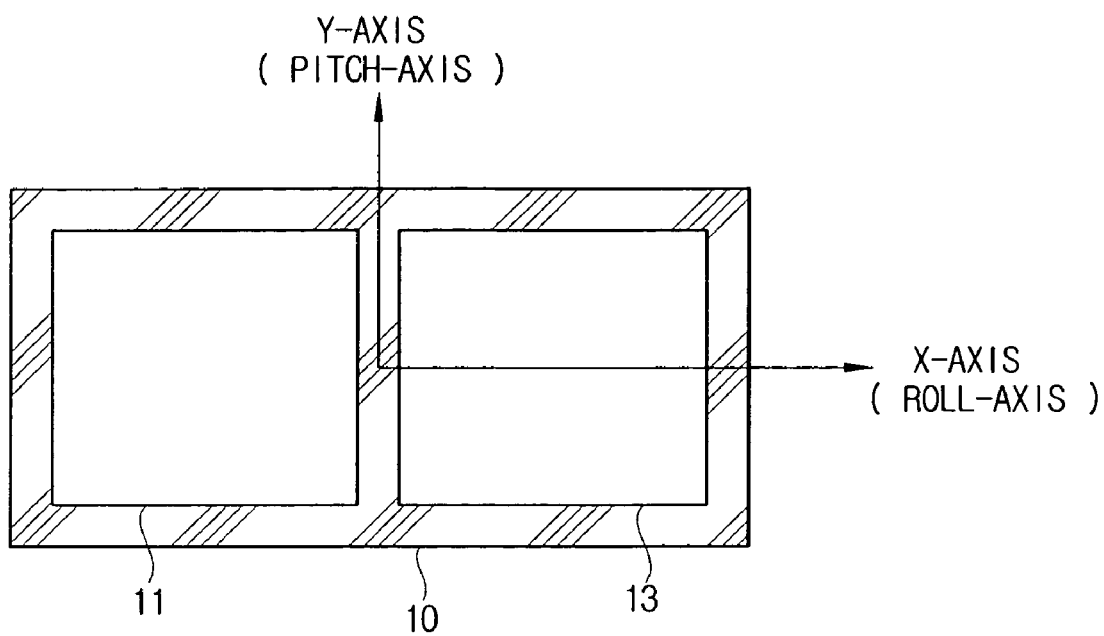
FIG. 1 is a schematic view showing two axes perpendicular to each other, which are standards for measuring a pitch angle and a roll angle of a geomagnetic sensor.
Figure 2:
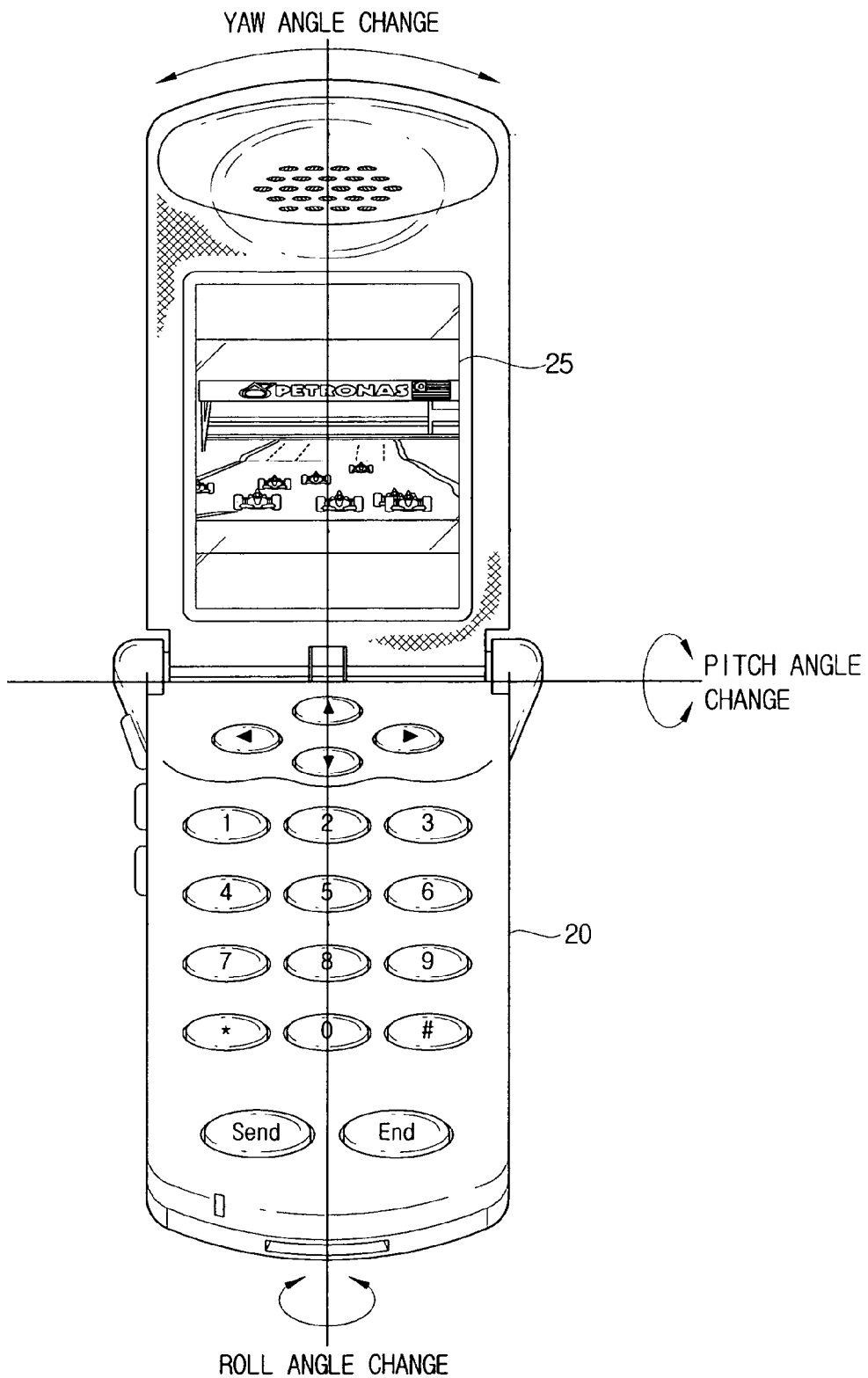
FIG. 2 is a schematic view showing changes of the pitch angle, the roll angle and a yaw angle in a mobile phone having the geomagnetic sensor of FIG. 1 therein.

Hereinafter, exemplary embodiments of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
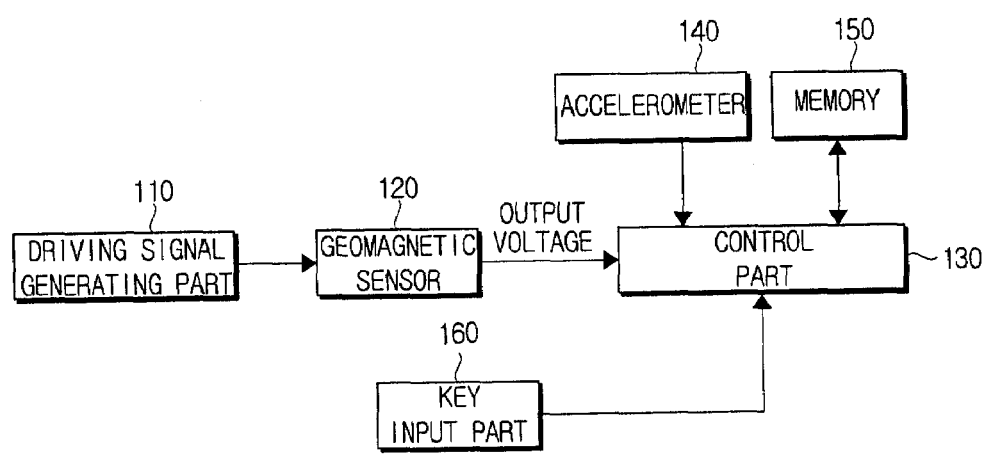
FIG. 3 is a block diagram showing the structure of an input device according to an exemplary embodiment of the present invention.

FIG. 3 is a block diagram illustrating the structure of an input device using a geomagnetic sensor according to an embodiment of the present invention. The input device comprises a driving signal generating part 110, a geomagnetic sensor 120, a control part 130, an accelerometer 140, a memory 150 and a key input part 160.

The driving signal generating part 110 generates and outputs a driving signal for driving the geomagnetic sensor 120. A pulse waveform and a reverse pulse waveform can be used for the driving signal.

When the driving signal is applied from the driving signal generating part 110, the geomagnetic sensor 120 outputs a predetermined voltage corresponding to geomagnetism.

The geomagnetic sensor 120 according to an embodiment of the present invention may be implemented by a bi-axis fluxgate. The bi-axis fluxgate geomagnetic sensor 120 comprises an X-axis fluxgate and a Y-axis fluxgate respectively formed on an X-axis and a Y-axis that are perpendicular to each other. The geomagnetic sensor 120 is driven by a pulse signal and an reverse pulse signal transmitted respectively to the X-axis and the Y-axis, thereby outputting a detection signal corresponding to an electromotive force generated by driving of the geomagnetic sensor 120. Generally, the X-axis fluxgate comprises a square-loop magnetic core arranged in X axis, and the Y-axis fluxgate comprises a square-loop magnetic core arranged in Y-axis. Each of the magnetic cores is coiled with a driving coil and a detection coil. When a driving pulse is applied to the driving coil, the X-axis and the Y-axis fluxgates are magnetized, and accordingly, an induced electromotive force can be detected through the detection coil. The yaw angle can be more precisely measured with three fluxgates, however, application of three fluxgates is not appropriate for a small-size portable electronic device such as the mobile phone 20, since it enlarges volume of the device. Therefore, the bi-axis fluxgate is generally used to measure a rotation angle.

The control part 130 performs normalization of mapping a fluxgate voltage of each axis of the geomagnetic sensor 120 into a value in a certain range, thereby calculating an azimuth. The azimuth λ is calculated by [Equation 1] as follows:

$$\lambda = \tan^{-1}(X\text{-axis output}/Y\text{-axis output}) \quad \text{[Equation 1]}$$

The control part 130 compares a current azimuth calculated by [Equation 1] to a previous azimuth stored in the memory 150, thereby determining a rotation degree. Since the geomagnetic sensor 120 senses absolute azimuth, when the geomagnetic sensor 120 is employed in the input device in which relative rotation needs to be taken into account, the rotation degree is determined by comparing the previous azimuth with the current azimuth. The rotation degree can be referred to as a rotation direction and a rotation amount and obtained by a sign and an absolute value of the rotation angle.

The control part 130 reflects a preset sensitivity in calculating the rotation angle such that the input signal is generated by the rotation angle differently recognized according to the sensitivity.

The accelerometer 140 comprises an X-axis accelerometer and a Y-axis accelerometer perpendicularly mounted in the X-axis direction and the Y-axis direction, respectively, and calculates a pitch angle and a roll angle using the voltage measured by the accelerometer 140 of each axis. When the geomagnetic sensor 120 is used for measurement of the current azimuth, the pitch angle and the roll angle are measured and the influence of the measured angles is compensated, thereby measuring the azimuth precisely.

Accordingly, when a delicate control is required, unlike when playing a game which requires immediate reactions, the rotation angle can be precisely measured using a tilt compensation algorithm reflecting the pitch angle and the roll angle. For the tilt compensation algorithm, various conventional algorithms can be used.

The key input part 160 comprises direction keys and numeric keys so that a user can select a tilt compensation mode.

If the user selects the tilt compensation mode, the input signal can be precisely generated. However, since calculation time increases in this case, the tilt compensation mode is inappropriate when using an input device requiring immediate reactions.

If the tilt compensation mode is not selected, the control part 130 determines whether at least one of the pitch angle and the roll angle exceeds a predetermined threshold. The threshold is experimentally measured with respect to the pitch angle and the roll angle. When the pitch angle and the roll angle exceed the threshold, it means that the calculated rotation angle is beyond an allowable error range. The threshold may be preset and stored to the memory 150 by a manufacturer, or may be varied as required by a user.

Besides the threshold, the memory 150 stores information on the previous azimuth, a normalizing factor, maximum and minimum values of the X-axis output and Y-axis output, and the sensitivity.

As the pitch angle and the roll angle change, the X-axis and the Y-axis fluxgate voltages output from the geomagnetic sensor 120 also change, and accordingly, the current azimuth calculated by the control part 130 changes. As a result, the input device is considered rotated, and the corresponding input signal is generated.

When at least one of the pitch angle and the roll angle exceeds the threshold, the control part 130 ignores the measured azimuth, thereby considering that rotation has not occurred. In other words, when the input device is tilted by more than a certain angle, rotation of the device is ignored.

In this case, the user may adjust the tilt of the input device such that the pitch angle and the roll angle can be decreased to below the threshold.

Figure 4:
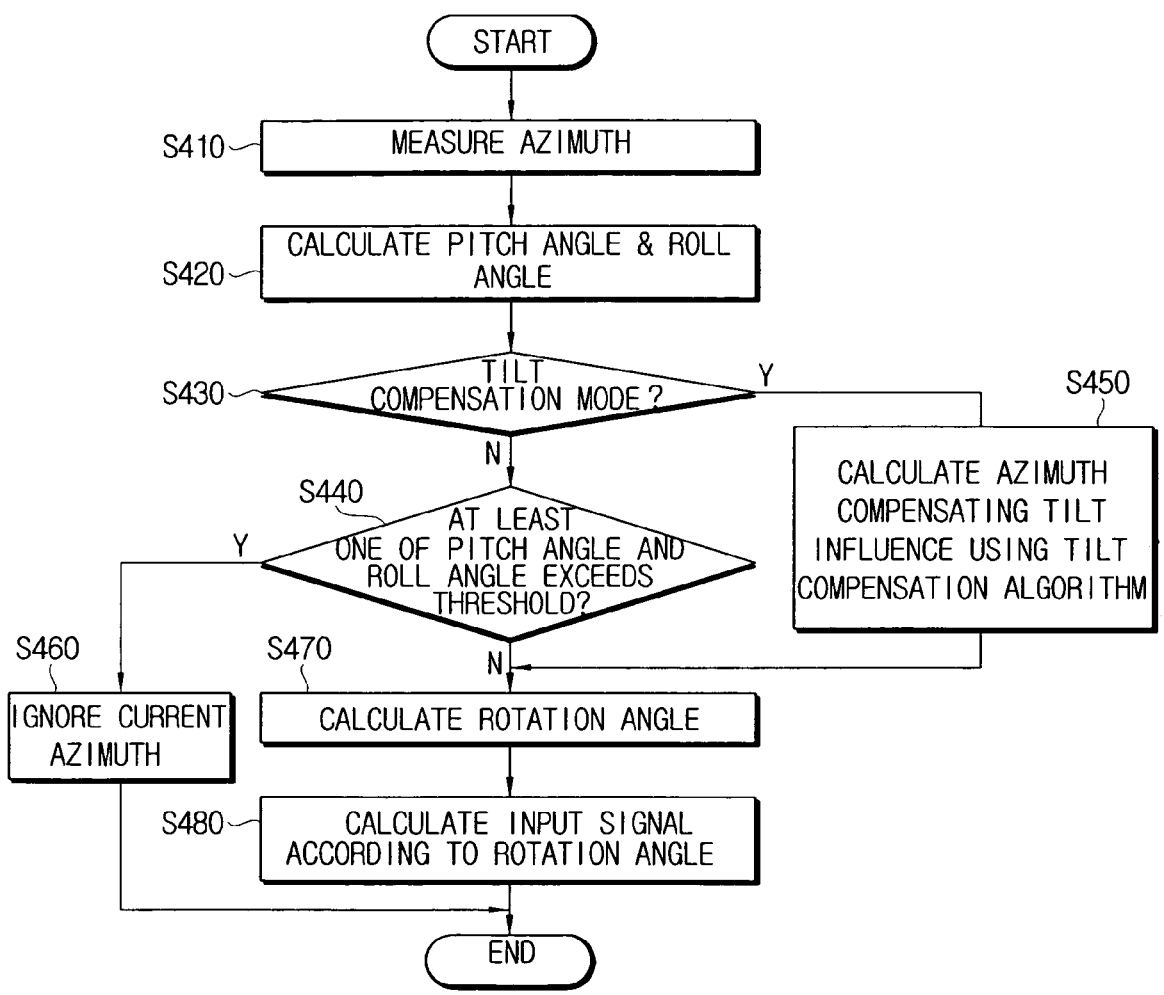
FIG. 4 is a flowchart for explaining a method for measuring an rotation angle using the input device regardless of tilt of the input device according to an exemplary embodiment of the present invention.

FIG. 4 is a flowchart for explaining a method for generating the input signal using the input device according to an embodiment of the present invention. The azimuth is measured (S410). For this, the control part 130 measures the azimuth using the voltage output from the geomagnetic sensor 120.

The pitch angle and the roll angle are calculated using the accelerometer 140 (S420).

The user can determine using the key input part 160 whether to select a tilt compensation mode. If the user selects the tilt compensation mode (S430), the azimuth is calculated using a predetermined tilt compensation algorithm (S450).

The control part 130 determines whether at least one of the pitch angle and the roll angle exceeds a threshold (S440). The threshold is experimentally determined with respect to the pitch angle and the roll angle, respectively, and stored to the memory 150.

If both the pitch angle and the roll angle are below the threshold, the control part 130 compares a currently measured azimuth to a previously measured azimuth stored in the memory 150, thereby calculating the rotation angle (S470).

Figure 5:
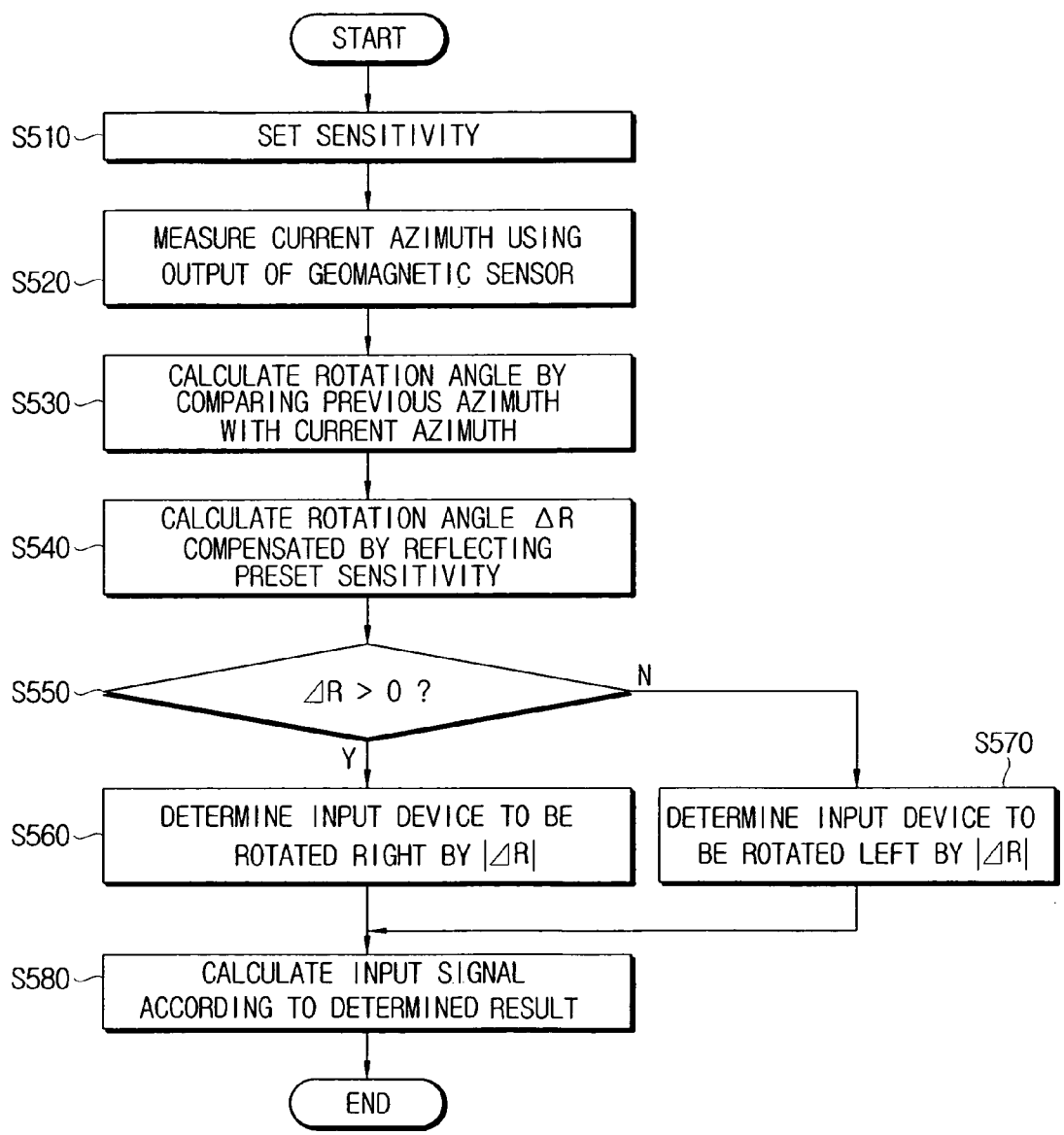
FIG. 5 is a flowchart for explaining a method for calculating an input signal according to the rotation angle in the input device according to an exemplary embodiment of the present invention.

FIG. 5 is a flowchart for explaining processes of calculating the rotation angle using the azimuth. Sensitivity is set by an inventor of the input device or a user (S510). As the sensitivity is set high, the input signal is generated to more delicately react to the rotation degree.

The current azimuth is measured using the output from the geomagnetic sensor 120 (S520). The current azimuth is calculated by [Equation 1] mentioned above.

When the rotation angle is calculated by comparing the current azimuth to the previous azimuth stored in the memory 150 (S530), a compensated rotation angle can be calculated by reflecting the sensitivity (S540). This can be expressed by an equation, $\Delta R$=(previous azimuth-current azimuth)/S, wherein $\Delta R$ denotes a rotation angle, and S denotes a preset sensitivity.

Next, a sign of the measured rotation angle is determined to detect a rotation direction (S550). The user can determine the relationship between the rotation direction and the sign of the rotation angle. For example, if the rotation angle has a plus sign, the input device is determined to be rotated right (S560), and if the rotation angle has a minus sign, the input device is determined to be rotated left (S570).

Finally, the control part 130 generates the input signal for moving a cursor as much as $\Delta R$ to the determined direction (S580).

When at least one of the pitch angle and the roll angle exceeds the threshold, an azimuth beyond an allowable range of error is measured. Therefore, the control part 130 ignores the azimuth measured when at least one of the pitch angle and the roll angle is greater than the threshold, and the input device is considered unrotated (S460). Accordingly, no input signal is generated.

Although the input device is actually rotated, if the pitch angle and the roll angle exceed the threshold, the rotation is ignored and no input signal is generated. Therefore, the user can normally utilize the input device by adjusting the tilt of the input device to below the threshold.

As can be appreciated from the above description, the user can determine the rotation angle of the input device using the geomagnetic sensor 120, and accordingly, an appropriate input signal can be generated. For example, when playing a game through a screen of the electronic device or controlling a cursor by rotating the electronic device itself besides using a conventional method of key operation for selection of a certain menu, the geomagnetic sensor 120 can be used since it does not necessitate an integral operation process and thereby prevents an error in the rotation amount, caused by an accumulated integral constant.

By ignoring the measured azimuth when the input device is rotated by more than a predetermined angle, unwanted generation of the input signal can be prevented. The input device according to an embodiment of the present invention may be adopted in small-size electronic devices such as a mobile phone and a personal digital assistant (PDA) to offer a variety of services such as games and a screen control.

While the invention has been shown and described with reference to certain embodiments thereof, it will be understood by those skilled in the art that various changes in form and details may be made therein without departing from the spirit and scope of the invention as defined by the appended claims.

What is claimed is:

1. An input device generating an input signal when the input device is rotated so that a rotation angle is changed, the input signal corresponding to the rotation angle, the input device comprising:
    a geomagnetic sensor outputting a voltage corresponding to geomagnetism; and
    a control part calculating an azimuth using the voltage output from the geomagnetic sensor and calculating the rotation angle by comparing the calculated azimuth to a previously measured azimuth, thereby generating the input signal corresponding to the rotation angle when the input device is tilted within a certain range and ignoring the rotation angle when the device is tilted beyond a certain range.

2. The input device of claim 1, wherein the geomagnetic sensor comprises a bi-axis fluxgate in which two fluxgates are respectively formed in directions of an X-axis and a Y-axis perpendicular to each other on a plane of the input device, and outputs voltages of each fluxgate corresponding to magnetism generated by a predetermined driving signal.

3. The input device of claim 2, further comprising:
    a driving pulse generation circuit for outputting the driving signal to drive the geomagnetic sensor; and
    an accelerometer for measuring a pitch angle and a roll angle of the input device.

4. The input device of claim 3, wherein the control part generates the input signal corresponding to the rotation angle only when at least one of the pitch angle and the roll angle is below a certain threshold, and ignores the azimuth if the pitch angle and the roll angle are greater than the threshold, thereby considering the input device unrotated.

5. The input device of claim 4, further comprising a memory for storing a maximum pitch angle and a maximum roll angle, which are experimentally determined, as the threshold.

6. The input device of claim 4, further comprising a key input part for inputting an external control signal for selection of a tilt compensation mode to compensate an influence of tilt of the input device while operating the azimuth.

7. The input device of claim 6, wherein, when the tilt compensation mode is selected, the control part operates the azimuth as compensated with the influence of the pitch angle and the roll angle, using a predetermined tilt compensation algorithm.

8. The input device of claim 1, wherein the rotation angle comprises a yaw angle.

9. The input device of claim 1, wherein said previously measured azimuth is stored in a memory.

10. A method for generating an input signal in an input device when the input device is rotated so that a rotation angle is changed, the input signal corresponding to the rotation angle, the method comprising:
   (a) outputting a voltage corresponding to geomagnetism;
   (b) calculating an azimuth based on the voltage and calculating the rotation angle by comparing the azimuth to a previously measured azimuth; and
   (c) generating the input signal corresponding to the rotation angle when the input device is tilted within a certain range and ignoring the rotation angle when the device is tilted beyond a certain range.

11. The method of claim 10, wherein the step (a) comprises outputting voltages of each fluxgate in a bi-axis fluxgate in which two fluxgates are respectively formed in directions of an X-axis and a Y-axis perpendicular to each other on a plane of the input device, the fluxgate voltages corresponding to magnetism.

12. The method of claim 11, further comprising measuring a pitch angle and a roll angle of the input device.

13. The method of claim 12, wherein the step (c) comprises generating the input signal only when at least one of the pitch angle and the roll angle is below a threshold, and ignoring the azimuth if the pitch angle and the roll angle are greater than the threshold, thereby considering the input device unrotated.

14. The method of claim 13, further comprising:
   inputting an external control signal for selection of a tilt compensation mode to compensate an influence of tilt of the input device while operating the azimuth; and
   when the tilt compensation mode is selected, operating the azimuth as compensated with the influence of the pitch angle and the roll angle, using a predetermined tilt compensation algorithm.

15. The method of claim 13, wherein the step (b) comprises:
   setting a predetermined sensitivity denoting a change of the input signal reacting to the rotation angle; and
   compensating the rotation angle by reflecting the sensitivity.

16. The method of claim 10, wherein the rotation angle comprises a yaw angle.

* * * * *